United States Patent [19]
Wilson

[11] Patent Number: 5,781,547
[45] Date of Patent: Jul. 14, 1998

[54] ROUTER AND METHOD FOR USE IN A COMMUNICATION SYSTEM

[75] Inventor: Christopher H. Wilson, Lake Zurich, Ill.

[73] Assignee: Motorola, Inc., Schaumburg, Ill.

[21] Appl. No.: 609,257

[22] Filed: Feb. 29, 1996

[51] Int. Cl.[6] .................................................. H04L 12/56
[52] U.S. Cl. .................................. 370/395; 370/352
[58] Field of Search .................................. 370/352, 353, 370/354, 355, 356, 392, 394, 395, 321, 314, 338, 347, 458, 389, 428

[56] References Cited

U.S. PATENT DOCUMENTS

| | | | |
|---|---|---|---|
| 5,280,469 | 1/1994 | Taniguchi et al. | 370/355 |
| 5,396,491 | 3/1995 | Newman | 370/355 |
| 5,613,069 | 3/1997 | Walker | 370/355 |

*Primary Examiner*—Dang Ton
*Attorney, Agent, or Firm*—Christopher P. Moreno

[57] ABSTRACT

A router (200) comprising a router controller (203) coupled to a packet-switched interface (202) and a circuit-switched timedivision multiplexed interface (204) allows framed packet-data to be conveyed through a circuit-switched system. Inbound address information (208) included with inbound framed packet-data (207) is used by the router controller to route inbound packets (209) to associated inbound time slots (211). Conversely, the router controller determines outbound address information (218) for outbound packets (216) based on identifications (214) of associated outbound time slots (213). Such a router can be incorporated into a communication system 700. Sites (701–702) that transceive framed packet-data are coupled to a circuit-switched digital cross-connect switch (705) via the routers. A system controller (706) controls the circuit-switched digital cross-connect switch such that the associated inbound time slots are broadcast to at least the associated outbound time slots.

15 Claims, 5 Drawing Sheets

-PRIOR ART-

ROUTER AND METHOD FOR USE IN A COMMUNICATION SYSTEM

FIELD OF THE INVENTION

The present invention relates generally to communication systems and, in particulars to a router and method for using the router in a dispatch communication system.

BACKGROUND OF THE INVENTION

Communication systems comprising packet-switched infrastructures are known in the art. FIG. 1 is a block diagram of a typical configuration for a wireless dispatch communication system 100 that allows one source of information to be concurrently distributed to many destinations and incorporates a packet-switched infrastructure in accordance with the prior art.

The wireless dispatch communication system 100 comprises a packet-based switch 101, base stations 103-105, a controller 107, and a packet duplicator 109. Packet-switched communication links 111-114 are used to couple the base stations 103-105 and the packet duplicator 109 to the packet-based switch 101. Receiving information from a wireless communication unit (such as a mobile or portable radio; not shown), a first base station 103 generates inbound framed packet-data. For the purposes of illustration, it is assumed that this inbound framed packet-data needs to be routed as outbound framed packet-data to two other base stations 104-105 in order to complete the communication. To this end, the first base station 103 signals the required destinations (i.e., base stations) to the controller 107 via a control link 116. Each of the base stations 103-105 is linked to the controller, although only one such link is shown.

The inbound framed packet-data is sent to the packet-based switch 101, where it is automatically routed to the packet duplicator 109. Responsive to the signals received from the first base station 103, the controller 107 instructs the packet duplicator 109 to generate two identical copies of the inbound framed packet-data. Using routing information supplied by controller 107, the packet duplicator 109 addresses the new packets (now considered outbound packets) with the addresses of the two other base station 104-105. The packet duplicator 109 sends the outbound packets to the packet-based switch 101, which is turn routes the outbound packets to the other base stations 104-105 in accordance with the appended addresses.

Currently, however, packet-switched systems of the sort described above are not capable of communicating with non-packet-based communication systems or equipment. For example, there currently is no method for connecting circuit-switched time-division multiplexed dispatch equipment to a packet-switched system. Conversely, there is currently no way to connect packet-based equipment, such as base stations, to a circuit-switched, time-division multiplexed infrastructure, e.g., a SMARTZONE infrastructure by Motorola, Inc. Therefore, it would be advantageous to provide a system that allows the interconnection of packet-switched and circuit-switched equipment. In particular, it would be advantageous to provide an apparatus and method that allows framed packet-data to be routed and copied for concurrent distribution to many destinations using a circuit-switched infrastructure. These destinations can be serviced by either packet-switched or circuit-switched infrastructure.

DESCRIPTION OF A PREFERRED EMBODIMENT

The present invention provides a method and apparatus for routing addressable, variable-length, framed packet-data, (hereinafter referred to as framed packet-data) in addition to non-addressable, fixed length data using fixed-length framing (hereinafter referred to as time slots), through the use of a unique router and circuit-switched infrastructure. The router comprises a router controller coupled to a packet-switched interface and a time-division multiplexed interface. Inbound address information included with inbound framed packet-data is used by the router controller to route inbound packets to associated inbound time slots. Additionally, the router controller determines outbound address information for outbound packets, received in associated outbound time slots, based on identifications (i.e., which physical time slot the outbound packets were carried in) of the associated outbound time slots.

With such a router, a circuit-switched infrastructure can be used to copy and route packet-data to multiple destinations. Sites that transceive framed packet-data are coupled to a circuit-switched digital cross-connect switch via the above-described routers. Under the control of a system controller, the circuit-switched digital cross-connect switch broadcasts (i.e., copies) the associated inbound time slots, an octet at a time, to at least the associated outbound time slots. In this manner, communication is provided between at least a pair of packet-based sites using a circuit-switched infrastructure.

Figure 1:
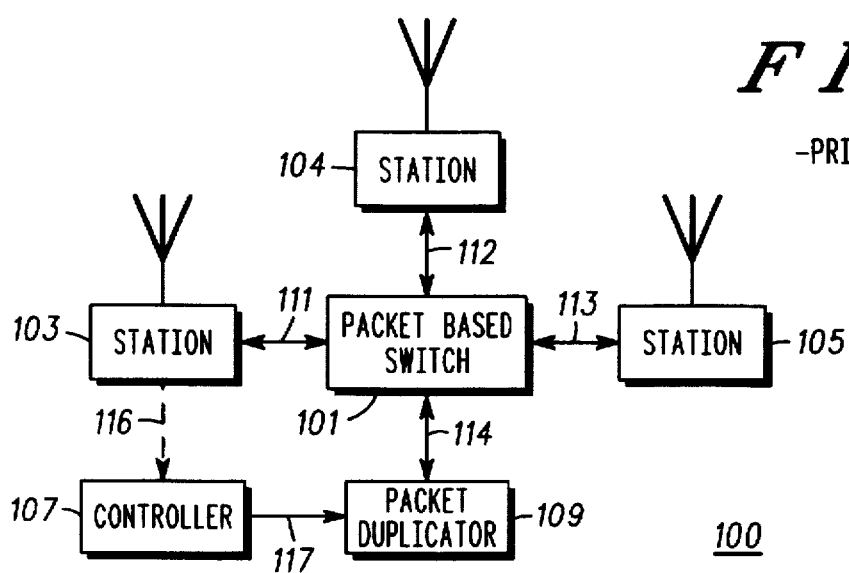
FIG. 1 is a block diagram of a typical configuration for a wireless communication system that incorporates a packet-switched infrastructure in accordance with the prior art.
Figure 2:
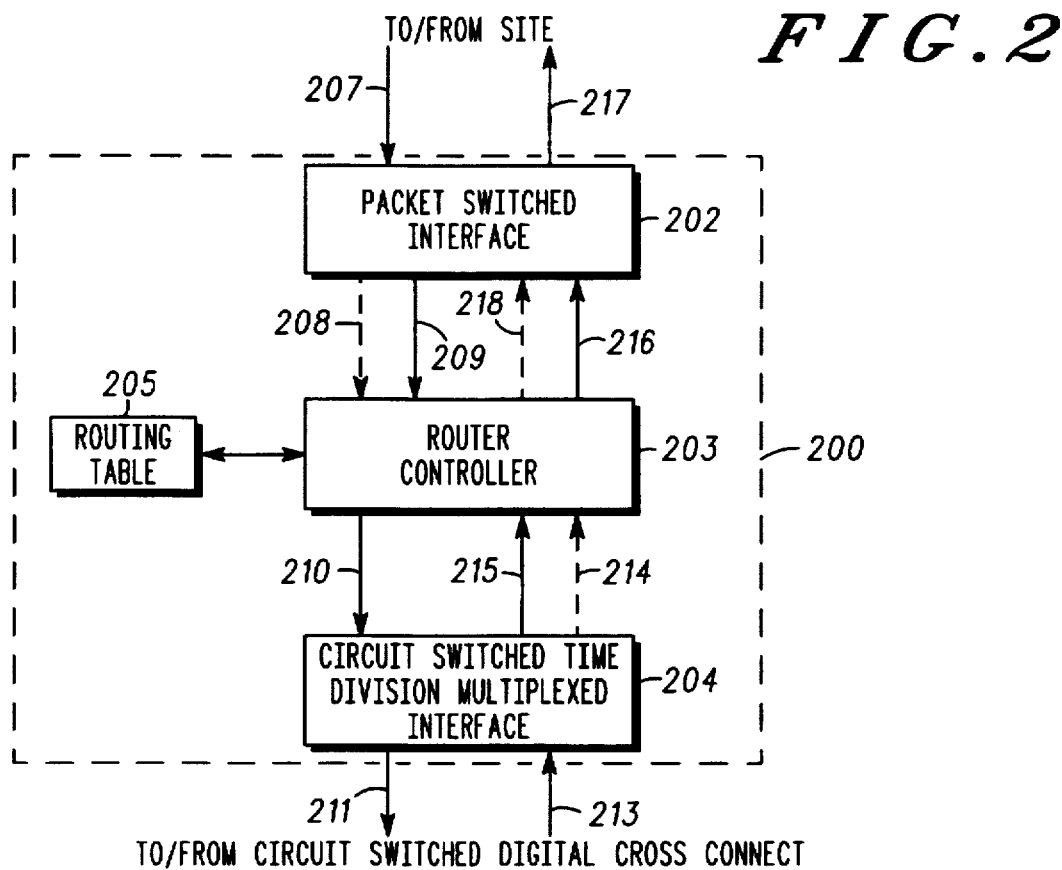
FIG. 2 is a block diagram of a router in accordance with the present invention.

The present invention can be more fully described with reference to FIGS. 2-8. FIG. 2 is a block diagram of a router 200 in accordance with the present invention. The router 200 comprises a packet-switched interface 202, a router controller 203, and a circuit-switched time-division multiplexed interface 204. The router 200 would typically be implemented using a customized, microprocessor-based platform, as known in the art. In practice, the packet-switched interface 202, the router controller 203, and the circuit-switched time-division multiplexed interface 204 could be most efficiently implemented as software algorithms carried out using memory and processors (not shown), as known in the art.

The packet-switched interface 202 receives inbound framed packet-data 207 and transmits outbound framed packet-data 217. The term "inbound" hereinafter describes data, in any form, that is generally being sent from a site to a switch, whereas the term "outbound" hereinafter describes data, in any form, that is generally being sent from a switch to a site. Both the inbound and outbound framed packet-data 207, 217 conform to any of a number of well-defined packet data protocols, such as high-level data link control protocol (HDLC) or frame relay In the preferred embodiment, the packet-switched interface 202 comprises an framed packet-data interface.

The circuit-switched time-division multiplexed interface 204 transmits associated inbound time slots 211 and receives associated outbound time slots 213. The term "associated" is used to describe a one-to-one correspondence between packets coming from/going to a given source and time slots within a circuit-switched time-division multiplexed infrastructure. The circuit-switched time-division multiplexed infrastructure relies on fixed periodic framing structures to organize the information it carries. Time slots are allocated 8 bits (one octet) every framing period. The time slots can be considered a physical address, assigned in a predetermined, fixed fashion. The circuit-switched infrastructure does not append address information to the packets being routed through the circuit-switched infrastructure.

The time slot octets are transferred through the circuit-switched infrastructure in a fixed, periodic framing format. In this manner, the circuit-switched interfaces can determine the individual time slots based on the fixed time relationship of the time slots to the fixed, periodic framing structure. In the preferred embodiment, the circuit-switched time-division multiplexed interface 204 comprises a non-addressable serial data interface that uses fixed framing length and fixed data length protocols, similar to the North American DS-1 standard or the CEPT standard E-1.

The router controller 203 divides the inbound packets 209 into inbound sub-packets 210, which are allocated to the associated time slot. The allocation of the sub-packet (one octet of the entire inbound packet) is based on inbound address information 208 as determined by the packet-switched interface 202. In the opposite direction, the router controller 203 routes outbound sub-packets 215 as outbound packets 216 based on identifications of the associated outbound time slots 214. Additionally, the router controller 203 determines outbound address information 218 based on the identifications of the associated outbound time slots 214. In the preferred embodiment, the router controller 203 performs the routing functions on both inbound and outbound data using a routing table 205.

The routing table 205, which is typically stored in memory (not shown), is unique to each site supported by the router 200 and describes the one-to-one correspondence between framed packet-data addresses and their associated time slots. In this manner, the router controller 203 can determine an identification for an associated inbound time slot 211 based on the inbound address information 208 and/or can determine outbound address information for outbound framed packet-data 217 based on the identification of an associated outbound time slot 214. For example, at any given router, the routing table could map inbound packets received by the router with packet address #2 to time slot #2, and in the opposite direction, outbound time slot #4 to packet address #4. In the preferred embodiment, the inbound address information 208 comprises the framed packet-data addresses or the data link connection identifier (DLCI) appended to each inbound framed packet-data. Likewise, the identifications of the associated outbound time slots 214 comprise framing information used in the time-division multiplexed scheme implemented by the circuit-switched time-division multiplexed interface 204.

Figure 3:
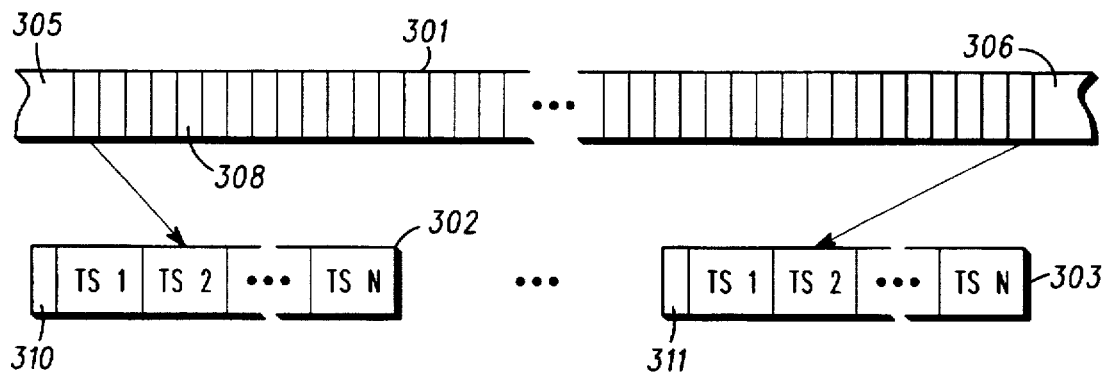
FIGS. 3 and 4 illustrate operation of the router depicted in FIG. 2.
Figure 5:
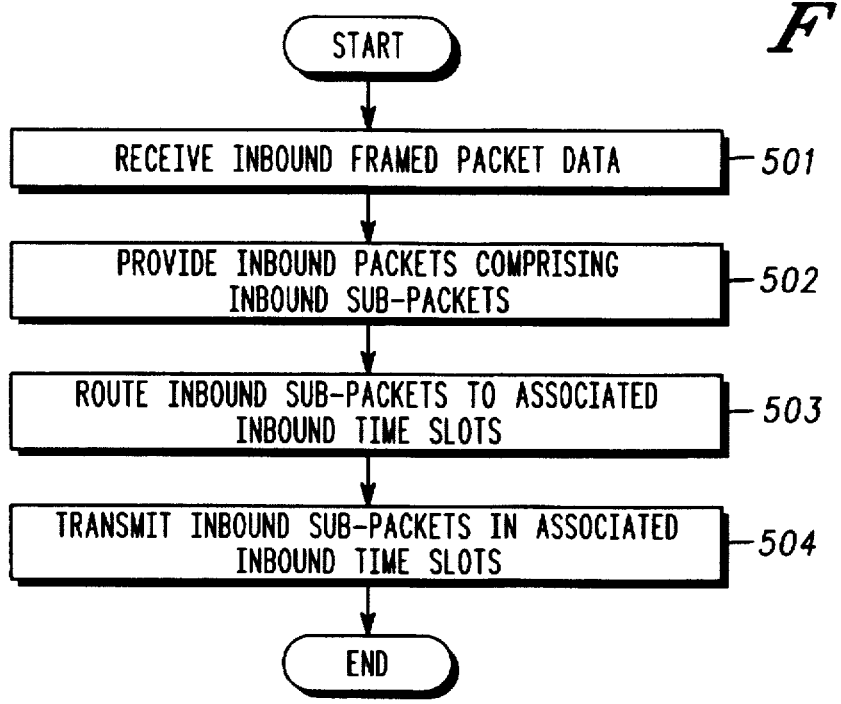
FIG. 5 is a flowchart illustrating operation of the router of FIG. 2 with respect to inbound framed packet-data.

FIG. 5 is a flowchart illustrating operation of the router 200 with respect to inbound framed packet-data. At step 501, the router receives inbound framed packet-data. As described above, the inbound framed packet-data is received by the packet-switched interface 202. This is further illustrated in FIG. 3. In particular, a complete inbound frame of packet-data 301 is shown. The additional parts that typically make up a frame, such as the start and stop flags, headers, payload field and error checking codes, are not shown. A previous frame of packet-data 305 and subsequent frame of packet-data 306 are also shown. As depicted in FIG. 3, the inbound packet 301 comprises a plurality of inbound sub-packets 308 In practice, each inbound packet can comprise up to thousands of inbound sub-packets, each inbound sub-packet comprising an octet (i.e., a group of eight bits) of information.

At step 502, the inbound packets from the framed packet-data are provided by the packet-switched interface to the router controller independent of the outbound address information The outbound address information from the framed packet-data is separately provided to the router controller.

At step 503, the router controller divides the inbound packets into sub-packets and routes the inbound sub-packets to associated inbound time slots based on the inbound address information provided at step 502. As described above, the inbound address information is used to access a routing table which provides information regarding the appropriate associated inbound time slot. This is illustrated in FIG. 3, where, for example, a first inbound sub-packet is routed to a second time slot (TS 2) in a first frame of time slots 302. Each frame of time slots 302-303 comprises N time slots demarcated by framing information 310-311. The router controller performs this by providing the sub-packet to the circuit-switched time-division multiplexed interface 204 at times corresponding to the particular associated inbound time slot. The router controller has knowledge of when each associated time slot occurs based on the framing information 310-311 for each frame of time slots, as provided by the circuit-switched time-division multiplexed interface.

At step 504, the circuit-switched time-division multiplexed interface transmits the inbound sub-packet, received at step 503, in the associated inbound time slot. Thus, the circuit-switched time-division multiplexed interface performs the actual physical layer implementation of interfacing the router to the circuit-switched infrastructure. For each inbound packet, steps 503 and 504 are repeated until all inbound sub-packets have been transmitted. This is illustrated in FIG. 3 where the last inbound sub-packet of the inbound packet is routed to the second time slot in an m'th frame of time slots 303. Because there is a unique one-to-one correspondence between inbound framed packet-data addresses and time slots, the sub-packets retain their identity as they are conveyed through the circuit-switched infrastructure without the inbound addresses. That is, packets can be reconstructed (as outbound packets) from the sub-packets and later routed based on the identification of the time slot from which the sub-packets were taken, as described below.

Figure 6:
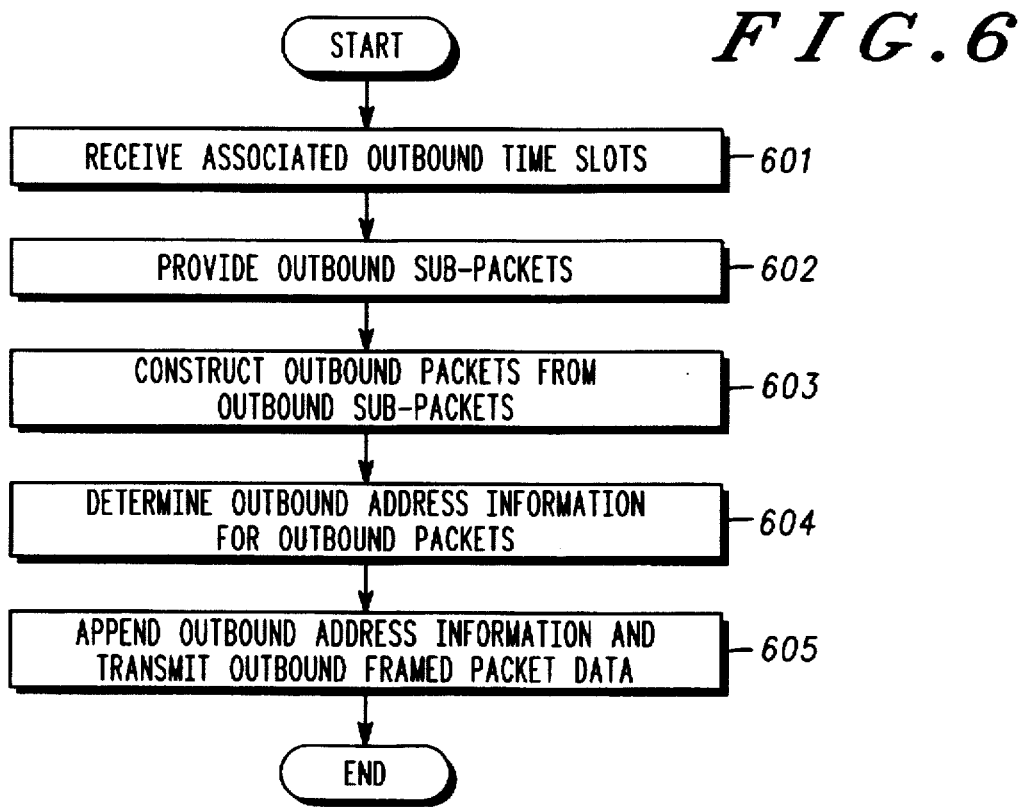
FIG. 6 is a flowchart illustrating operation of the router of FIG. 2 with respect to outbound framed packet-data.

FIG. 6 is a flowchart illustrating operation of the router 200 with respect to outbound framed packet-data. At step 601, the router receives, via the circuit-switched time-division multiplexed interface 204, associated outbound time slots. Each outbound time slot comprises (conveys) an outbound sub-packet.

Figure 4:
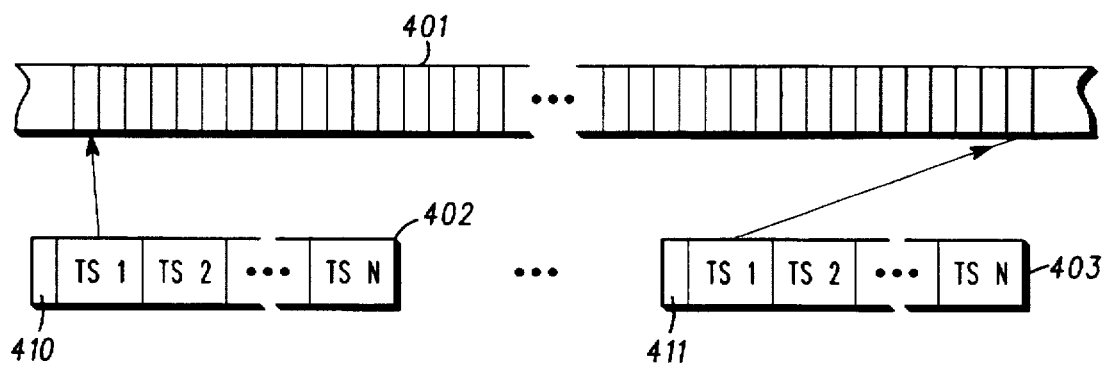

Each outbound sub-packet comprises the same amount of information as each inbound sub-packet described above (i.e., an octet). This is further illustrated in FIG. 4. Frames of time slots 402-403 are received. Each frame of time slots is demarcated by framing information 410-411. At step 602, the circuit-switched time-division multiplexed interface provides the outbound sub-packets, received from the outbound time slots, to the router controller. Additionally, the identifications of the associated outbound time slots are provided to the router controller using the framing information 410–411. At step 603, the router controller constructs outbound packets from the outbound sub-packets. To properly reconstruct the outbound packet, the sub-packets included in similarly identified time slots (i.e., all sub-packets from the first time slot in each frame of time slots) are used. Step 603 is repeated until a complete packet is formed. This is shown in FIG. 4 where the outbound sub-packet from the first time slot (TS 1) of the first frame of time slots 402 is used as the first outbound sub-packet of an outbound packet 401. The outbound packet 401 is complete when the outbound sub-packet from the first time slot (TS 1) of the m'th frame of time slots 403 is used as the last outbound sub-packet of the outbound packet 401.

At step 604, the router controller determines the outbound address information for the outbound packets formed at step 603. As described above, the outbound address information is determined from the routing table based on the identification of the associated outbound time slots used to provided the outbound sub-packets. For example, an outbound packet constructed entirely from outbound sub-packets received in a first time slot of each frame of time slots, the associated outbound address information could correspond to framed packet-data address #1. The resulting outbound packets 216 and outbound address information 218 are forwarded to the packet-switched interface 202.

At step 605, the packet-switched interface appends outbound address information from step 604 to the outbound packets formed at step 603. The packet-switched interface transmits the outbound framed packet-data in accordance with the packet-switched protocol. Because there is a unique one-to-one correspondence between outbound framed packet-data addresses and time slots, the reconstructed outbound packets accurately represent the packets originally sent as inbound packets, as discussed below.

Figure 7:
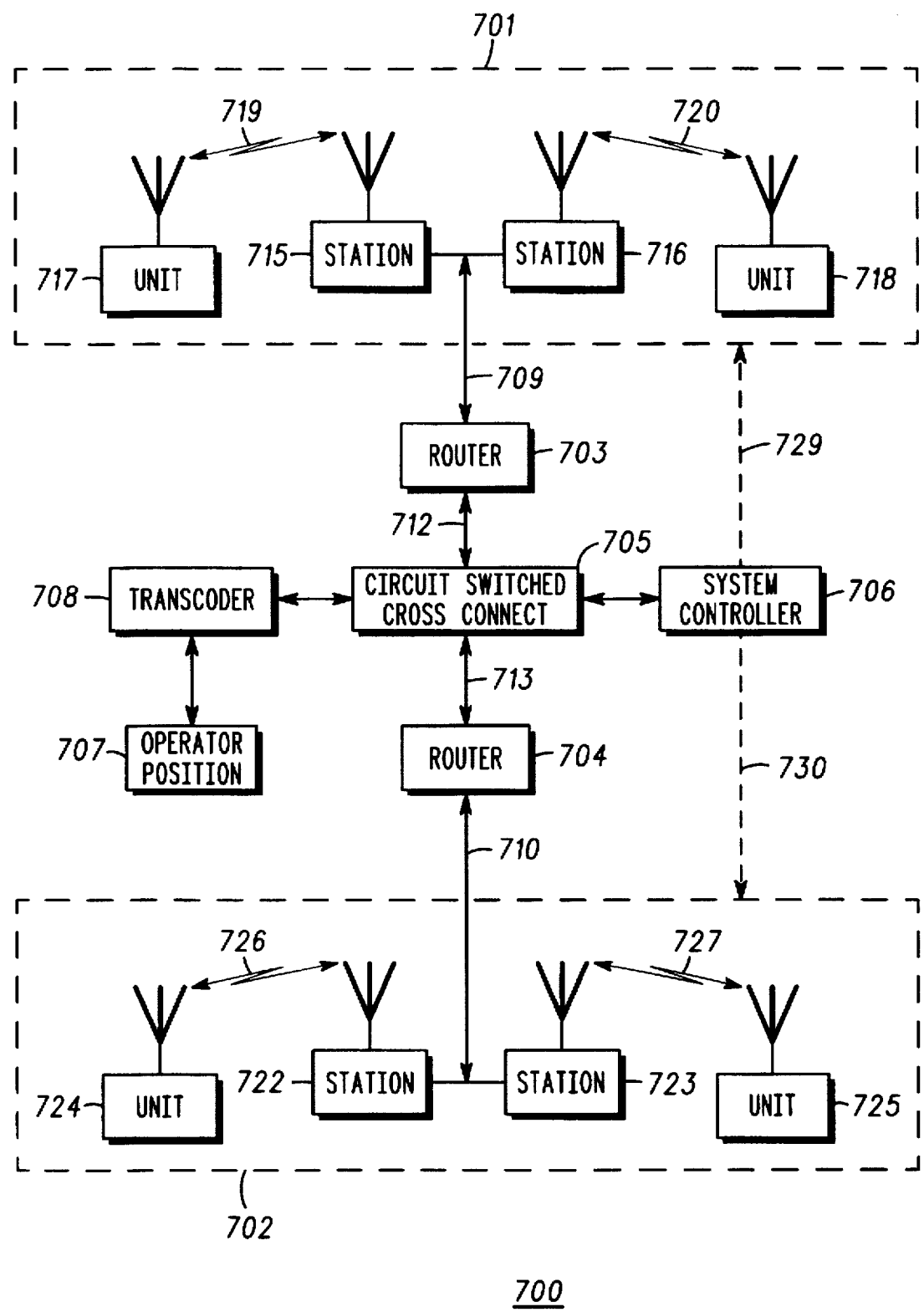
FIG. 7 is a block diagram of a communication system that incorporates the router of FIG. 2.

Using the router described above, a one-to-many dispatch communication system having a circuit-switched infrastructure can be used compatibly with framed packet-data. FIG. 7 is a block diagram of a communication system 700 that incorporates routers as described above. The communication system 700 comprises at least two routers 703–704 in communication, via packet switched links 709–710, with an associated one of at least two wireless communication sites 701–702. The routers are in communication, via non-addressable serial data links 712–713 that use fixed framing length and fixed data length protocols (such as T-1 or E-1 links, as known in the art), with a circuit-switched digital cross-connect switch 705. The circuit-switched digital cross-connect switch 705 operates on a time-division multiplexed basis using time slot interchange technology and is capable of supporting 960 time slots. A suitable circuit-switched digital cross-connect switch 705 is an EMBASSY switch manufactured by Motorola, Inc.

The circuit-switched digital cross-connect switch 705 is also in communication with a system controller 706 and an operator position 707. A suitable system controller 706 is a SMARTZONE zone controller manufactured by Motorola, Inc. A suitable operator position 707 is a Centracom Gold Series operator position manufactured by Motorola, Inc. In practice, the operator position 707 requires audio input in either a waveform encoded or compressed format. As such, a transcoder 708 may be required to convert the information received as sub1 packets from the circuit-switched digital cross-connect 705 into the appropriated format required by the operator position 707. Such transcoders are known in the art, and can be readily adapted for use in a variety of systems. From the vantage of the circuit-switched digital cross-connect switch 705, the operator position 707 is no different than a site 701–702 as far as sending and receiving data. The system controller 706 manages the setup and breakdown of communication within and between the sites 701–702 using control links 729–730. In accordance with the present invention, the system controller 706 also includes a static and dynamic table (not shown) comprising the routing tables from the inbound and outbound time slots on communication links 712–713 from/to each of the routers 703–704. In this manner, the system controller 706 can control the passage of associated inbound and outbound time slots, as described above, through the circuit-switched digital cross-connect switch 705.

Each wireless communication site 701–702 includes base stations 715–716, 722–723 in wireless communication with communication units 717–718, 724–725 via one or more wireless communication resources 719–720, 726–727. A suitable base station is an Intellirepeater manufactured by Motorola, Inc. A suitable wireless communication unit is an ASTRO SABER radio manufactured by Motorola, Inc.

The base stations 715–716, 722–723, when transceiving a wireless communication that needs to be routed through the circuit-switched infrastructure to another site, produce inbound framed packet-data. The inbound address information described above corresponds to a unique inbound address used by each base station 715–716, for site 701 and unique inbound address used by each base station 722–723 for site 702 to form inbound framed packet-data (not shown) that is carried on packet-switched data links 709, 710 which is sent to router 703, 704, respectively. The routers 703–704 use this inbound address information to route the inbound packet-data to the correct time slot. Because each router is independent of the other routers and the inbound address is not sent through the circuit-switched infrastructure, the inbound address information for the inbound framed packet-data and outbound address information for the outbound framed packet-data can be reused between each router 703, 704 and its respective base stations 715–716, 722–723 and their respective sites 701,702.

Figure 8:
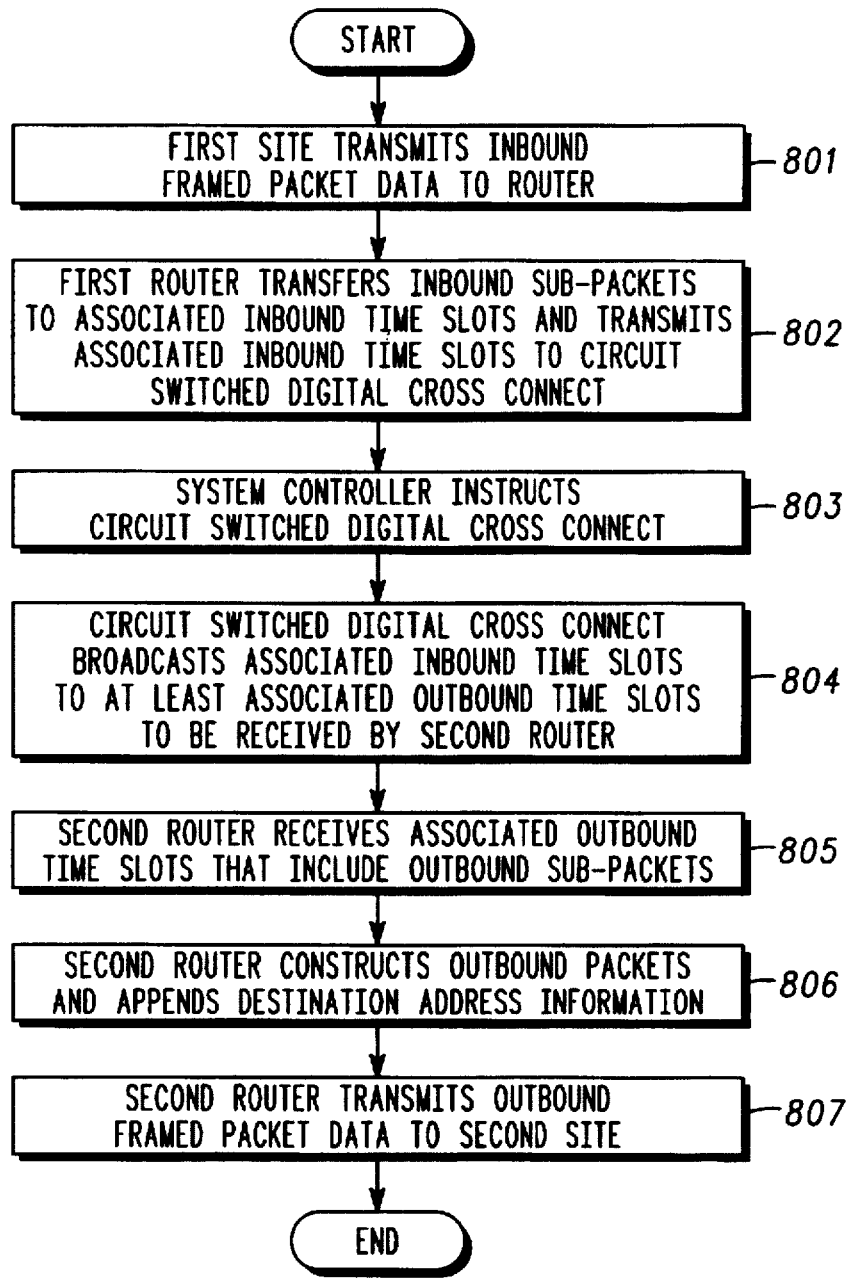
FIG. 8 is a flowchart illustrating operation of the communication system of FIG. 7.

FIG. 8 is a flowchart illustrating operation of the communication system 700. At step 801, a first site 701 transmits inbound framed packet-data to a (uniquely associated) first router 703. This occurs when a communication unit 717–718 in the first site 701 initiates a communication requiring the participation the operator position 707 or another communication unit 724–725 at a second site 702. For the purposes of illustration, it will be hereinafter assumed that a first unit 717 has transmitted a communication request and is attempting to communicate with the operator position 707 and a second communication unit 725 in the second site 702. Assuming that the first unit 717 wirelessly communicates with a first base station 715, the inbound address information, forming part of the inbound framed packet-data, will correspond to the first base station 715.

At step 802, the first router 703, in accordance with its operation discussed above relative to FIGS. 3 and 5, transfers the inbound sub-packets included in the inbound packets to associated inbound time slots, and then transmits the associated inbound time slots to the circuit-switched digital cross-connect switch 705. As described previously, the associated inbound time slots uniquely correspond with the address assigned for use by the first base station. Furthermore, because the unaddressed serial data links 712–713 are uniquely associated with each router 712–713, each associated inbound time slot coming into the circuit-switched digital cross-connect switch 705 is unique within the system to the extent that each base station in the system is uniquely identified.

Either prior to or simultaneous with step 802, the system controller 706, responsive to the communication request made by the first unit 717, instructs the circuit-switched digital cross-connect switch 705 to broadcast the associated inbound time slots to at least one set of associated outbound time slots at step 803. Because the system controller 706 includes the master table, it can determine, based on the requested targets for the communication included in the communication request, which associated outbound time slots are required to complete the communication. Following the previous example, the system controller would instruct the circuit-switched digital cross-connect switch 705 to broadcast (meaning copy to one or more time slots) the contents of the associated inbound time slots to associated outbound time slots corresponding to the operator position 707 and a second base station 723 corresponding to the second unit 725. At step 804, the circuit-switched digital cross-connect switch 705 broadcasts the associated inbound time slots, as they are received, in accordance with the instructions received from the system controller at step 803. As soon as the inbound sub-packets in each associated inbound time slot is copied into and associated outbound time slot, it effectively becomes an outbound sub-packet to the extent that the circuit-switched digital cross-connect switch 705 will send it to a site or operator position.

At step 805, the second router 704 receives the associated outbound time slots that included the now outbound sub-packets. At step 806, the second router 704, in accordance with its operation discussed above relative to FIGS. 4 and 6, constructs outbound packets from the outbound sub-packets included in the associated outbound time slots, and then appends outbound address information to the outbound packets to produce outbound framed packet-data. In the present example, the outbound address information, as determined by the identification of the associated outbound time slots, will correspond to the second base station 723. At step 807, the second router 704 transmits the outbound framed packet-data, via the packet-switched link 710, to the second site 702. Upon receiving the outbound framed packet-data, the second base station 723 wirelessly transmits the information contained therein to the second unit 725, thereby completing the call. Although the present example considers only one-way communication, the present invention can be equally applied to a two way communication by performing the same operation described above in the opposite direction. Furthermore, more than one destination site could be specified in accordance with the present invention and is required for use by a dispatch-type two-way communication system.

The present invention provides a method and apparatus for routing framed packet-data in a circuit switched infrastructure through the use of a unique router. By uniquely associating inbound and outbound packet addresses with corresponding inbound and outbound time slots within the circuit-switched infrastructure, the router allows a circuit-switched infrastructure to copy and route packet-data to multiple destinations. In this manner, communications between two or more packet-based sites using a circuit-switched infrastructure can be achieved. This is an improvement over prior art techniques that did not allow circuit-switched infrastructures to convey framed packet-data.

I claim:

1. A router comprising
   a packet-switched interface that receives inbound framed packet-data to provide inbound packets and that transmits outbound framed packet-data comprising outbound packets, the inbound framed packet-data including inbound address information that is not included with the inbound packets, the outbound framed packet-data including outbound address information not included with the outbound packets, the inbound packets comprising inbound sub-packets, and the outbound packets comprising outbound sub-packets;

a circuit-switched, time-division multiplexed interface that transmits the inbound sub-packets in associated inbound time slots and that receives the outbound sub-packets from associated outbound time slots; and a router controller, coupled to the packet-switched interface and the circuit-switched time-division multiplexed interface, that routes the inbound sub-packets to the associated inbound time slots based on the inbound address information and that constructs the outbound packets from the outbound sub-packets and routes the outbound packets with the outbound address information based on identifications of the associated outbound time slots, wherein a routing table of the router controller describes a one-to-one correspondence between the inbound address information and the associated inbound time slots, and between the outbound address information and the identifications of the associated outbound time slots.

2. The router of claim 1, wherein the packet-switched interface comprises an addressable, serial data interface that uses variable-length, framed packet-data protocols.

3. The router of claim 1, wherein the circuit-switched, time-division multiplexed interface comprises a non-addressable serial data interface that uses fixed framing length and fixed data length protocols.

4. A communication system comprising:
   at least two sites that transmit inbound framed packet-data and receive outbound framed packet-data over respective packet-switched links, the inbound framed packet-data comprising inbound packets and inbound address information, the outbound framed packet-data comprising outbound packets and outbound address information, the inbound packets comprising inbound sub-packets, and the outbound packets comprising outbound sub-packets;

at least two routers, each coupled to an associated one of the respective packet-switched links, that transfer the inbound sub-packets, without the inbound address information, to associated inbound time slots based on the inbound address information, and that construct the outbound packets from the outbound sub-packets included in associated outbound time slots and append, to the outbound packets, the outbound address information based on identifications of the associated outbound time slots;

a circuit-switched digital cross-connect switch, coupled to the at least two routers; and a system controller, coupled to the at least two sites and the circuit-switched digital cross-connect switch, that instructs the circuit-switched digital cross-connect switch to broadcast the associated inbound time slots to at least the associated outbound time slots when a communication request is received from one of the at least two sites.

5. The communication system of claim 4, each of the at least two sites further comprising at least one communication unit that wirelessly transceives voice information with at least one base station.

6. The communication system of claim 5, wherein the at least one base station transceives the voice information as the inbound and outbound framed packet-data over the respective packet-switched links.

7. The communication system of claim 6, each of the respective packet switched links further comprising an addressable, serial data interface that uses variable-length, framed packet-data protocols.

8. The communication system of claim 4, further comprising a plurality of non-addressable serial data links that use fixed framing length and fixed data length protocols, wherein each of the at least two routers is coupled to the circuit-switched digital cross-connect switch via a one of the plurality of non-addressable serial data links.

9. The communication system of claim 8, each of the at least two routers further comprising a memory device that includes a routing table, wherein the routing table describes a one-to-one correspondence between the inbound address information and the associated inbound time slots, and between the outbound address information and the associated outbound time slots.

10. The communication system of claim 8, further comprising at least one operator position coupled to the circuit-switched digital cross-connect switch via a transcoder.

11. In a router comprising a packet-data interface and a circuit-switched time-division multiplexed interface coupled to a router controller, a method for routing data, the method comprising steps of:

receiving, via the packet-data interfaces inbound framed packet-data that includes inbound address information;

providing, by the packet-data interface, inbound packets that do not include the inbound address information, the inbound packets comprising inbound sub-packets;

routing, by the router controller, the inbound sub-packets to associated inbound time slots based on the inbound address information; and transmitting, by the circuit-switched time-division multiplexed interface, the inbound sub-packets in the associated inbound time slots.

12. The method of claim 11, further comprising steps of:

receiving, via the circuit-switched time-division multiplexed interface, associated outbound time slots that include outbound sub-packets;

providing, by the circuit-switched time-division multiplexed interface, the outbound sub-packets to the router controller;

constructing, by the router controller, outbound packets from the outbound sub-packets, wherein the outbound packets do not include outbound address information;

determining, by the router controller, outbound address information for the outbound packets based on identifications of the associated outbound time slots; and appending, by the packet-data interface, the outbound address information to the outbound packets to produce outbound framed packet-data, and transmitting the outbound framed packet-data.

13. In a communication system comprising at least two sites, at least two routers, each of the at least two routers coupled to an associated one of the at least two sites, a circuit-switched digital cross-connect switch coupled to the at least two routers, at least one operator position coupled to the circuit-switched digital cross-connect switch, and a system controller coupled to the circuit-switched digital cross-connect switch, wherein the system controller transmits a communication grant to a first site of the at least two sites responsive to a communication request received from the first site, a method for routing data, the method comprising steps of:

transmitting, by the first site, inbound framed packet-data to a first router of the at least two routers, the inbound framed packet-data comprising inbound packets and inbound address information, the inbound packets comprising inbound sub-packets;

transferring, by the first router, the inbound sub-packets, without the inbound address information, to associated inbound time slots based on the inbound address information;

transmitting, by the first router, the associated inbound time slots to the circuit-switched digital cross-connect switch;

instructing, by the system controller responsive to the communication request, the circuit-switched digital cross-connect switch to broadcast the associated inbound time slots to at least associated outbound time slots;

broadcasting, by the circuit-switched digital cross-connect switch, the associated inbound time slots to at least the associated outbound time slots;

receiving, by a second router of the at least two routers, the associated outbound time slots;

constructing, by the second router, outbound packets from outbound sub-packets included in the associated outbound time slots and appending outbound address information to the outbound packets, wherein the outbound address information is based on identifications of the associated outbound time slots; and transmitting, by the second router, outbound framed packet-data to a second site of the at least two sites, the outbound framed packet-data comprising the outbound packets and the outbound address information.

14. The method of claim 13, wherein the step of transmitting inbound framed packet-data by the first site further comprises steps of:

wirelessly transmitting, by a first communication unit of the first site, voice information to a first base station of the first site; and transmitting, by the first base station, the voice information as the inbound framed packet-data to the first router, wherein the inbound address information corresponds to the first base station.

15. The method of claim 14, further comprising the step of constructing outbound packets and appending outbound address information to the outbound packets, wherein the outbound address information corresponds to a second base station of the second site.

\* \* \* \* \*